US008773872B2

(12) United States Patent
Adragna

(10) Patent No.: US 8,773,872 B2
(45) Date of Patent: Jul. 8, 2014

(54) CONTROL DEVICE FOR RESONANT CONVERTERS

(75) Inventor: Claudio Adragna, Monza (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 439 days.

(21) Appl. No.: 12/902,689

(22) Filed: Oct. 12, 2010

(65) Prior Publication Data

US 2011/0085355 A1 Apr. 14, 2011

(30) Foreign Application Priority Data

Oct. 12, 2009 (IT) .............................. MI2009A1738
Jul. 28, 2010 (IT) .............................. MI2010A1398

(51) Int. Cl.
*H02M 3/335* (2006.01)
*H02M 7/5387* (2007.01)

(52) U.S. Cl.
USPC ........ 363/21.02; 363/21.03; 363/98; 323/288

(58) Field of Classification Search
USPC ........... 323/288; 363/17, 18, 21.02, 21.03, 98
See application file for complete search history.

(56) References Cited

U.S. PATENT DOCUMENTS

| | | | | |
|---|---|---|---|---|
| 5,615,093 | A * | 3/1997 | Nalbant | 363/25 |
| 7,202,694 | B2 * | 4/2007 | Eberlein | 324/120 |
| 7,545,369 | B1 * | 6/2009 | Lan et al. | 345/204 |
| 7,768,806 | B2 * | 8/2010 | Lin et al. | 363/97 |
| 8,040,122 | B2 * | 10/2011 | Chang et al. | 323/288 |
| 2003/0132211 | A1 * | 7/2003 | Aigner | 219/130.21 |
| 2007/0201254 | A1 * | 8/2007 | Sakurai | 363/132 |
| 2008/0130328 | A1 | 6/2008 | Choi | |
| 2012/0069605 | A1 * | 3/2012 | Choi | 363/21.02 |

FOREIGN PATENT DOCUMENTS

GB  2306062 A  4/1997

OTHER PUBLICATIONS

Liu R. et al., "The LLC-Type Series Resonant Converter—Variable Switching Frequency Control," IEEE 1990, pp. 509-512.
Youssef M.Z. et al., "A Front End Self-Sustained LLC Resonant Converter," IEEE 35th Annual Power Electronics Specialists Conference, 2004, pp. 2651-2656, Aachen, Germany.
Nalbant, M.K., "A New and Improved Control Technique Greatly Simplifies the Design of ZVS Resonant Inverters and DC/DC Power Supplies," Applied Power Electronics Conference and Exposition, Texas, US, Mar. 5-9, 1995, pp. 694-701.
Pinheiro et al., "Self-Sustained Oscillating Resonant Converters Operating Above the Resonant Frequency," IEEE Transactions on Power Electronics, 14(5): 803-814, Sep. 1999.

* cited by examiner

*Primary Examiner* — Adolf Berhane
*Assistant Examiner* — Fred E Finch, III
(74) *Attorney, Agent, or Firm* — Seed IP Law Group PLLC

(57) ABSTRACT

A control device for a switching circuit of a resonant converter having a direct current at the output, the switching circuit having at least one half bridge of at least first and second transistors connected between an input voltage and a reference voltage. The half bridge is adapted to generate a periodic square wave voltage to drive the resonant circuit of the resonant converter; The control device has a circuit to proportionally generate a first voltage to a switching period, and a circuit adapted to limit the voltage at the ends of a capacitor between a reference voltage and the first voltage, and a further circuit structured to control the switching off of a first or second transistor at the time instant in which the voltage across the capacitor has reached the first voltage.

33 Claims, 10 Drawing Sheets

CONTROL DEVICE FOR RESONANT CONVERTERS

BACKGROUND

1. Technical Field

The present disclosure relates to a control device for resonant converters.

2. Description of the Related Art

Forced switching converters (switching converters) with devices used for controlling them are known in the state of the art. Resonant converters are a wide range of forced switching converters characterized by the presence of a resonant circuit playing an active part in determining the input-output power flow. In these converters, a bridge (half-bridge) consisting of four (two) power switches (typically MOSFET power transistors), which is supplied by a direct voltage, generates a voltage square wave that is applied to a resonant circuit tuned to a frequency close to the fundamental frequency of the square wave. Thereby, because of its selective features, the resonant circuit mainly responds to this fundamental component while negligibly to the higher-order harmonics of the square wave. As a result, the circulating power may be modulated by changing the frequency of the square wave, holding the duty cycle constant at 50% and, according to the resonant circuit configuration, the currents or voltages associated with the power flow have a sinusoidal or a piecewise sinusoidal shape.

These voltages are rectified and filtered so as to provide d.c. power on the load. In offline applications, for security requirement issues, the rectification and filtering system supplying the load is coupled to the resonant circuit by a transformer providing the isolation between source and load required by the above-mentioned regulations. As for all the isolated network converters, also in this case a distinction is made between a primary side (as related to the primary winding of the transformer) connected to the input source and a secondary side (as related to the secondary winding—or to the secondary windings—of the transformer) providing power to the load through the rectification and filtering system.

Among the many types of resonant converters, the so-called LLC resonant converter, especially in the half-bridge version thereof, is widely used. Such a designation comes from the fact that the resonant circuit employs two inductors (L) and a capacitor (C); a principle schematic of an LLC resonant converter is shown in FIG. 1. Resonant converter 1 has a half-bridge of transistors Q1 and Q2 between the input voltage Vin and the ground GND and driven by a driving circuit 3. The common terminal HB between the transistors Q1 and Q2 is connected to a circuit block 2 that has a series of a capacitor Cr, an inductance Ls, and another inductance Lp connected in parallel to a transformer 10 with a center-tap secondary. The two windings of the center-tap secondary of the transformer 10 are connected to the anodes of two diodes D1 and D2, whose cathodes are both connected to the parallel of a capacitor Cout and a resistance Rout; across the parallel Rout, Cout there is the output voltage Vout of the resonant converter, while the output current Iout flows through the resistance Rout.

The resonant converters offer considerable advantages as compared to the traditional switching converters (non-resonant, typically PWM—Pulse Width Modulation—controlled): wave forms without steep edges, low switching losses of the power switches due to the "soft" switching thereof, high conversion efficiency (>95% is easily reachable), ability to operate at high frequencies, low EMI (Electro Magnetic Interference) generation and, ultimately, high power density (enabling to achieve conversion systems capable of handling considerable powers in relatively small space).

As in most dc-dc converters, a closed-loop, negative feedback control system keeps the output voltage of the converter constant upon changing the operating conditions, that is the input voltage Vin or the output current Iout thereof. This is achieved by comparing a portion of the output voltage with a reference voltage Vref. The difference or error signal Er between the value provided by the output voltage sensing system (usually, a resistance divider) and the reference value is amplified by an error amplifier whose output Vc modifies a quantity x inside the converter which the energy carried by the converter in each switching cycle substantially depends on. As set forth above, such a significant quantity in resonant converters is the switching frequency of the square wave stimulating the resonant circuit.

Again, as is common in the control systems of the dc-dc converters, the frequency response of the error amplifier must be properly designed so as to ensure:

- a stable control loop (i.e., the fact that upon disturbances of the operating conditions of the converter, once the transient caused by the disturbance is finished, the output voltage tends to recover a constant value close to the value before the perturbation;
- a good regulation (i.e., the new constant value recovered by the output voltage following a disturbance is very close to that before the disturbance);
- good dynamic performance (i.e., during the transient following a disturbance the output voltage is not so different from the desired value and the transient itself is short).

The above-mentioned control objectives may be expressed in terms of some characteristic quantities of the transfer function of the control loop, such as the bandwidth, the phase margin, and the d.c. gain. In a dc-dc converter, these objectives may be achieved by acting on the frequency response of the error amplifier, by modifying the gain thereof and conveniently placing the poles and zeroes of its transfer function (frequency compensation), which is normally achieved by using passive networks having resistances and capacities of appropriate value connected thereto.

In order to determine which is the required frequency compensation to obtain the desired features of the transfer function of the control loop, however, it must be known in advance both the gain of the modulator, i.e., the system converting the control voltage Vc into the control quantity x, as well as the frequency response of the converter itself to the variations of quantity x.

The modulator gain does not usually depend on the frequency, at least within the range of the relevant frequencies, which may not be higher than half of the switching frequency of the converter by virtue the Shannon's theorem, and it is fixed within the control integrated circuit.

As far as the frequency response of a dc-dc converter, even in the presence of a strongly non-linear system just because of the switching action, with suitable approximations and under certain hypothesis, this may be described and represented by the same means used for the linear networks and, therefore, by a transfer function characterized by gain, zeroes and poles. This transfer function essentially depends on the topology of the converter, i.e., on the mutual configuration of the elements handling the power, the operation mode thereof, i.e., whether, at every switching cycle, there is a continuous current circulation in the magnetic part (Continuous Current Mode, CCM) or not (Discontinuous Current Mode, DCM), the quantity x which is controlled by the control loop. While in PWM converters different control methods are commonly used—e.g., the width of the pulse controlling the power switches (direct duty cycle control and, therefore, x=D) or the peak of the current flowing through the switches (peak current mode control, x=Ip) are directly acted upon—traditionally, in resonant converters, the quantity used to control the converter is directly the switching frequency of the square wave applied to the resonant circuit.

In all the integrated control circuits for dc-dc resonant converters available in the market, the control directly operates on the oscillation frequency of the half-bridge (Direct Frequency Converter, DFC). FIG. 2 shows a control system for this type of resonant converters. The output of the error amplifier 4, having a part of the output voltage Vout at the input of the inverting terminal and a reference voltage Vref at the non-inverting terminal, on the secondary side is transferred to the primary side by a photo-coupler 5 so as to ensure the primary-secondary isolation according to the security requirements and acts upon a voltage-controlled oscillator (VCO) 6 or a current-controlled oscillator (ICO) inside the control integrated circuit 30.

This type of control arises two classes of problems. A first class relates to the fact that the dynamic small-signal models for resonant converters expressed in terms of gain, poles and zeroes are not known in literature (but in some approximated forms of questionable practical use), differently from what occurs, instead, for PWM converters, i.e., the transfer function of the power stage is not known. A second class of problems relates to that, according to study results based on simulations, the transfer function of the power stage shows a strongly variable d.c. gain, and a variable number of poles from one to three and with very mobile position, depending on the operating point. Finally, there is a zero due to the output capacitor.

The considerable variation of the gain and the so-highly variable pole configuration make the frequency compensation of the feedback control loop quite problematic. As a result, it is virtually impossible to obtain a transient response optimized under all the operating conditions, and a considerable trade-off between stability and dynamic performances is required. Furthermore, there is a strong dependence of the energy transfer on the input voltage (audio susceptibility), whereby the control loop must strongly intervene and considerably change the operating frequency for compensating the variations. Taking into account that an alternate component with a frequency twice that of the main voltage always exists in the input voltage of the converter, the loop gain at that frequency needs to be quite high, so as to effectively reject the alternate component and considerably attenuate the residual ripple visible in the output voltage.

All these factors present problems not completely solvable, particularly when the load supplied by the converter has considerable dynamic changes and/or the specifications on the dynamic accuracy or the response speed or the rejection of the input ripple is strict.

Finally, another problem related to the DFC control method is that of the statistical spread of values of the components of the resonant circuit (Cr, Ls and Lp) due to their tolerances. Indeed, generally speaking, in order to avoid a converter from abnormally operating, the control quantity x should be limited. In this case, the resonant controllers implementing DFC allow the operational frequency of the half-bridge to be high- and low-limited. These limits should be set by taking into account that, due to the above-mentioned value spread, the operating frequency range of the converter will change accordingly. Therefore, the minimum limit set to the frequency should be lower than the minimum value which could be taken by the lower end of the range, and the maximum limit should be higher than the maximum value which could be taken by the higher end of the range. This considerably reduces the effectiveness of the frequency limitation as a means for preventing abnormal operating conditions.

One approach reported in the literature is that described in the article "Self-Sustained Oscillating Resonant Converters Operating Above the Resonant Frequency" to H. Pinheiro, P. K. Jain, and G. Joos, published in IEEE Transactions on Power Electronics, Vol. 14, No. 5, September 1999, p. 803-814, wherein the quantity x which is controlled by the feedback loop is the phase shifting between the current of the resonant circuit and the square wave voltage applied to the circuit by the half-bridge or bridge. In the above-mentioned article it is shown that, since said phase shifting has values within a fixed range (from 0 to 90° late) regardless of the features of this resonant circuit and the operating conditions, the control variable will also have the same independence property. In the "control terminology" this is called a "robust control." Again, it is shown that the system obtained is absolutely stable in any operational conditions, provided that the current of the resonant circuit is late with respect to the voltage applied thereto. This restraint coincides with the necessary condition to obtain the "soft" switching for the MOSFET transistors belonging to the half-bridge.

BRIEF SUMMARY

In accordance with the present disclosure, a control device of a switching circuit for a resonant converter having a direct current at the output is provided. The switching circuit includes at least a half-bridge of at least first and second transistors connected between an input voltage and a reference voltage, the half-bridge adapted to generate a periodic square wave voltage to drive the resonant circuit of the resonant converter, the periodic square wave voltage ranging from a high voltage corresponding to the input voltage to a low voltage corresponding to the reference voltage, the control device adapted to control the half-bridge according to the time period of charging or discharging a capacitor. The switching circuit also includes a circuit adapted to synchronize the starting time instant of the time period of discharging or charging the capacitor with the zero crossing of a signal representative of the current flowing in the resonant circuit, and a further circuit adapted to control the switching off of the first or the second transistor at the end of the time period of discharging or charging the capacitor.

By virtue of the present disclosure, a control device for resonant converters may be provided, which allows the dynamic order of the converter to be reduced; by possibly making it equivalent to a single-pole system (at least in the frequency range relevant to the design of the frequency compensation), so as to improve the transient response thereof to the load variations.

The control device further reduces the audio susceptibility of the converter, either through a reduced sensitivity to the variations of the input voltage or to the possibility of more freely setting the loop gain, so as to improve both the transient response to the variations of the input voltage, and the rejection of the input voltage ripple.

The control device also allows the operation limits of the converter to be set up regardless the dispersion of the resonant circuit parameters, so as to improve the strength of the control.

In accordance with another aspect of the present disclosure, a circuit is provided that includes a control circuit structured to control a time period of charging and discharging a capacitor coupled to a resonant circuit, the control circuit comprising a first circuit structured to synchronize the time period of charging and discharging the capacitor at a start time with a crossing of a zero value of a signal that indicates current flowing in the resonant circuit and a second circuit structured to control a switching off of the charging or discharging of the capacitor at an end time of the charging or discharging of the capacitor.

In accordance with another aspect of the present disclosure, the foregoing circuit has the control circuit structured to control a half bridge circuit that generates a periodic square wave voltage in accordance with the start time and end time of the charging or discharging time period of the capacitor.

In accordance with a further aspect of the present disclosure, a control device of a switching circuit for a resonant converter having a direct current at the output is provided. The switching circuit includes at least a half-bridge of at least first and second transistors connected between an input voltage and a reference voltage, the half-bridge adapted to generate a periodic square wave voltage to drive the resonant circuit of the resonant converter, the periodic square wave voltage ranging from a high voltage corresponding to the input voltage to a low voltage corresponding to the reference voltage, the control device is adapted to control the half-bridge according to the time period of charging a capacitor, the control device including a circuit adapted to synchronize the starting time instant of the time period of charging the capacitor with the zero crossing of a signal representative of the current flowing in the resonant circuit, and a further circuit adapted to control the switching off of the first or the second transistors at the end of the time period of charging the capacitor. It further includes a circuit for proportionally generating a first voltage to the switching period, and a circuit adapted to limit the voltage at the ends of the capacitor between a reference voltage and the first voltage, the further circuit also adapted to control the switching off of the first or second transistors of the half-bridge at the time instant when the voltage at the ends of the capacitor has reached the first voltage.

In accordance with another aspect of the present disclosure, a control device of a switching circuit for a resonant converter having a direct current at the output is provided; the switching circuit includes at least one half-bridge circuit of at least first and second transistors connected between an input voltage and a reference voltage, the half bridge structured to generate a periodic square wave voltage to drive the resonant circuit for the resonant converter, the periodic square wave voltage ranging from a high voltage corresponding to the input voltage, and a low voltage corresponding to the reference voltage, the control device structured to control the half-bridge according to the time period of charging a capacitor, the control device comprising a circuit adapted to synchronize the starting time instant of the time period of charging the capacitor with the zero crossing of a signal representative of the current flowing in the resonant circuit and a further circuit structured to control the switching off of the first or the second transistor at the end of the time period of charging the capacitor, and a circuit to proportionally generate a first voltage to the switching period, and a circuit adapted to limit a voltage at the ends of the capacitor between a reference voltage and the first voltage, the further circuit structured to control the switching off of the first or second transistor of the half-bridge circuit at the time instant in which the voltage at the ends of the capacitor has reached the first voltage.

By virtue of this aspect of the present disclosure, a control device for resonant converters is provided that allows the operational limits of the converter to be set regardless of the dispersion of the parameters of the resonant circuit, so as to improve the strength of the control.

BRIEF DESCRIPTION OF THE DRAWINGS

The features and advantages of the present disclosure will be apparent from the following detailed description of practical embodiments thereof, shown by way of non-limiting example in the accompanying drawings, in which.

DETAILED DESCRIPTION

Figure 1:
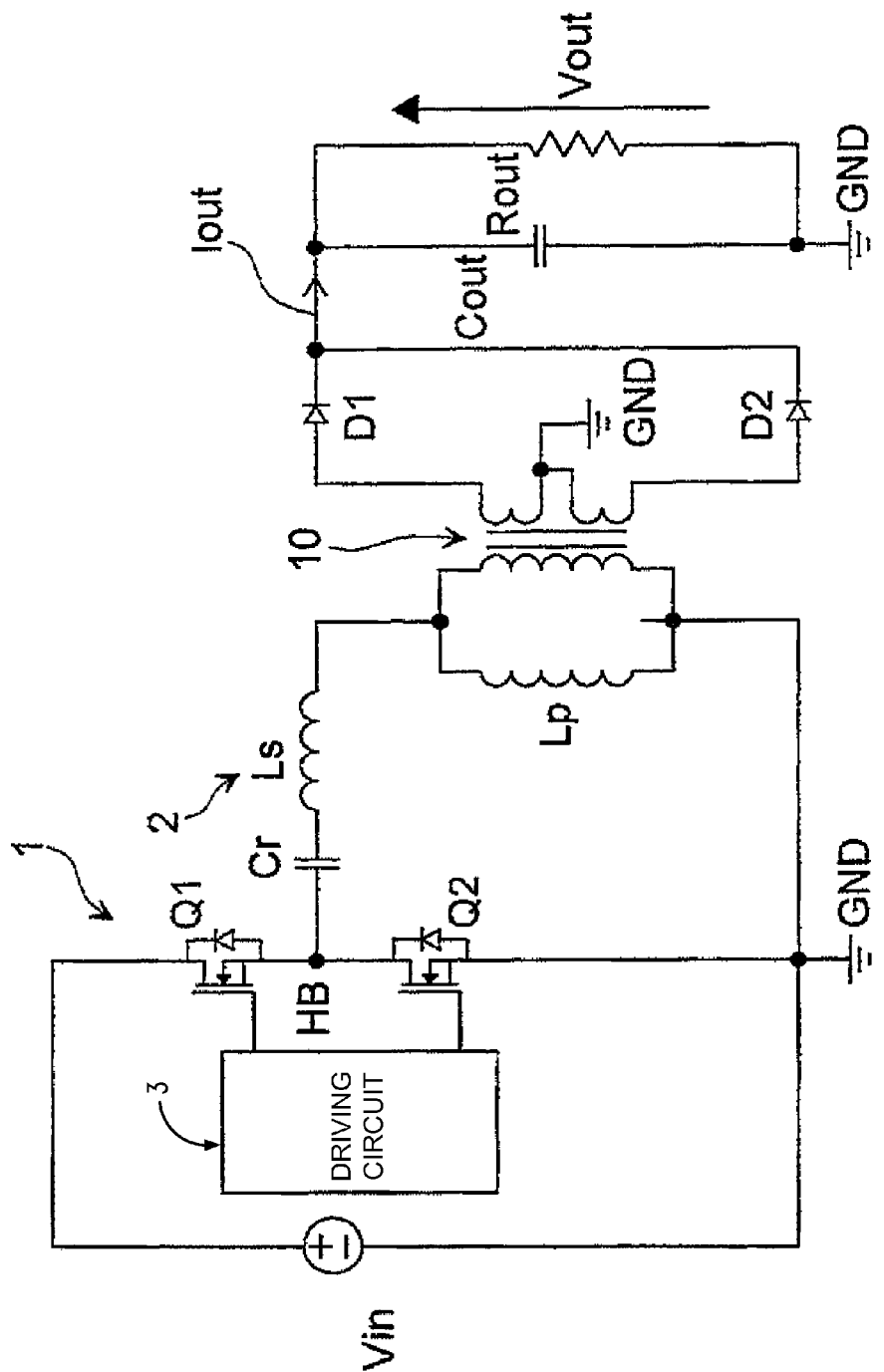
FIG. 1 shows a circuit schematic of a LLC resonant converter in accordance with the known art.
Figure 2:
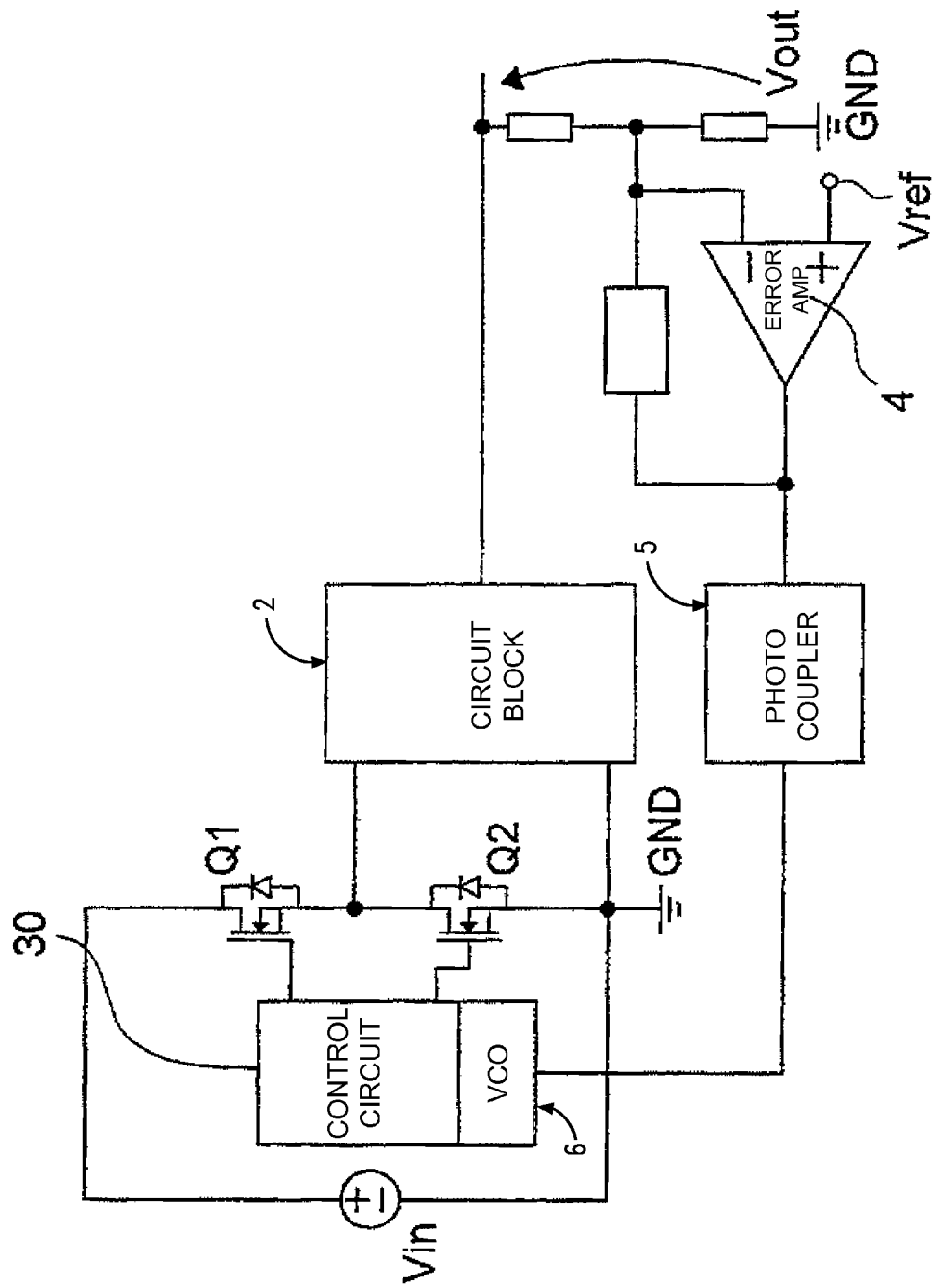
FIG. 2 shows a block diagram of a resonant converter with adjustment of the output voltage in accordance with the known art.
Figure 3:
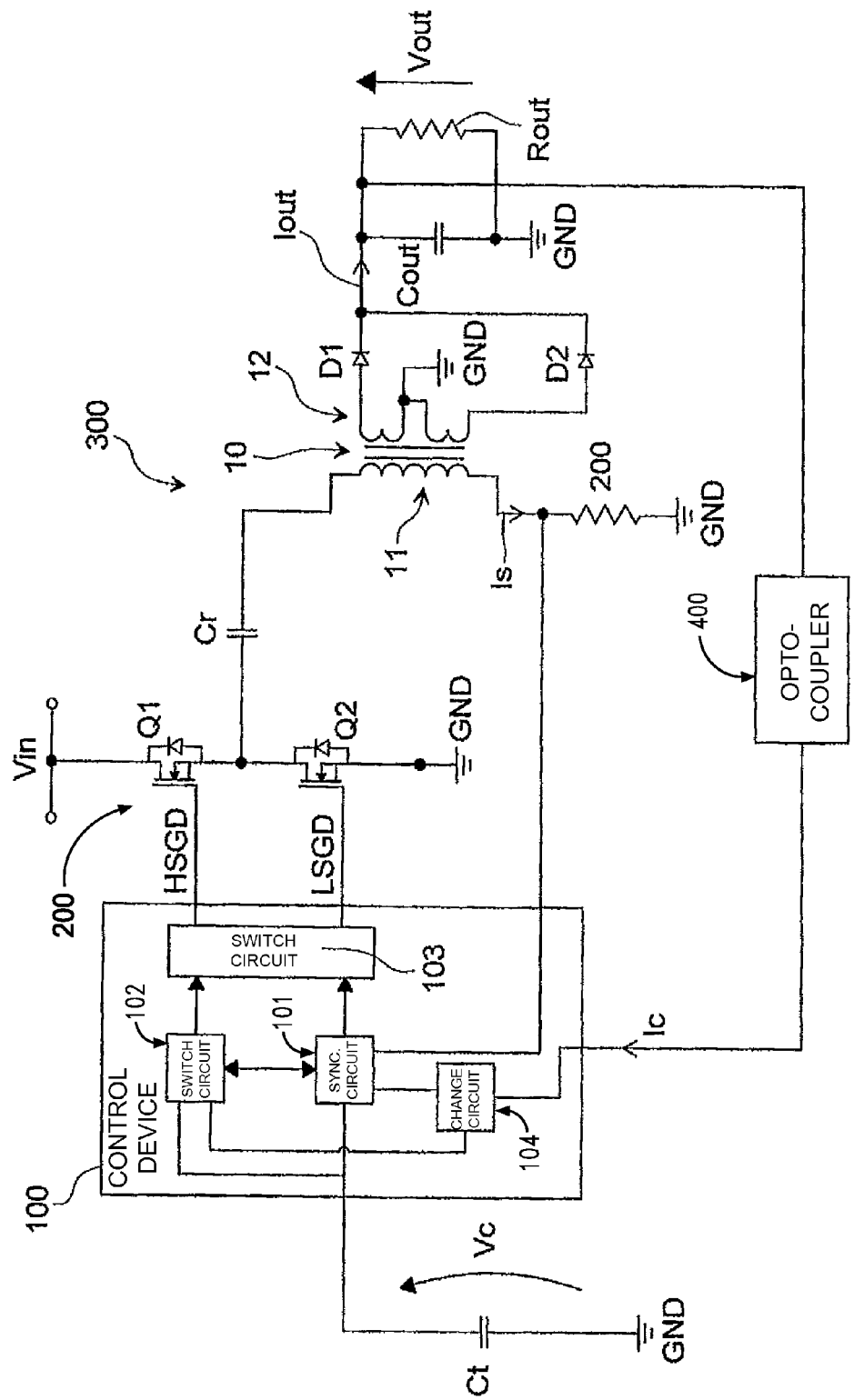
FIG. 3 shows a circuit schematic of a resonant converter with control device in accordance with the present disclosure.

FIG. 3 shows a resonant converter with a control device 100 in accordance with the present disclosure. The control device 100 controls a switching circuit 200 of the resonant converter; the switching circuit 200 includes at least one half-bridge of at least first Q1 and second Q2 transistors connected between an input voltage Vin and a reference voltage, preferably the ground GND. The half-bridge 200 is adapted to generate a periodic square wave voltage ranging from a high voltage, corresponding to the input voltage Vin, to a low voltage, corresponding to the reference voltage GND; the half-bridge 200 drives a resonant circuit 300, preferably including a series of a capacity Cr and a transformer 10 with a primary 11 and a center-tap secondary 12. The two windings of the center-tap secondary 12 of transformer 10 are connected to the anodes of two diodes D1 and D2 whose cathodes are both connected to the parallel of a capacity Cout and a resistance Rout. The output voltage Vout of the resonant converter is present across the parallel Rout, Cout while the output current Iout flows through Rout.

The control device 100 is adapted to control the half-bridge 200 according to the time period of discharging or charging a capacitor Ct outside the control device. The control device 100 is normally integrated in a silicon chip or substrate. The control device 100 alternately controls the switching on and off of the transistors Q1 and Q2; and the control device 100 controls the switching on of transistor Q1 or transistor Q2 and the respective switching off of transistor Q2 or transistor Q1 according to the time period Tc of charging or discharging or both charging and discharging the external capacitor Ct.

The control device 100 also includes a circuit means 101 adapted to synchronize the starting time instant Tstart of the time period Tc of discharging or charging the capacitor Ct with the zero crossing of a signal Vs representative of the current Is flowing through the resonant circuit, in particular the voltage signal across the resistance Rs arranged between the primary 11 of transformer 10 and ground GND. The device 100 further includes circuits 102, 104 adapted to charge and discharge the capacitor Ct between a prefixed minimum value Vv, GND and a prefixed maximum value Vp.

Circuits 102, 103 are adapted to control the switching off of the first Q1 or second Q2 transistor of the half-bridge at the end of the time period of charging or discharging the comparator Ct. Circuit 103 is particularly adapted to control the switching off of the first Q1 or second Q2 transistor of the half-bridge at the time instant T1 where the voltage at the terminals of the capacitor reach the maximum value Vp or the minimum value Vv, GND. The circuit 103 is preferably adapted to control the switching off of transistor Q1 at the end of the time period of charging the external capacitor Ct, and the switching off of transistor Q2 at the end of the time period of discharging the external capacitor Ct. Circuit 103 controls the transistors Q1 and Q2 by the signals HSGD and LSGD.

The signal Ic representative of the output voltage Vout or the output current Iout is preferably carried on device 100 by an isolated coupler 400, for example an opto-coupler. The current signal Ic is preferably directly or indirectly used to charge or discharge the capacitor Ct from the circuit 104.

Figure 4:
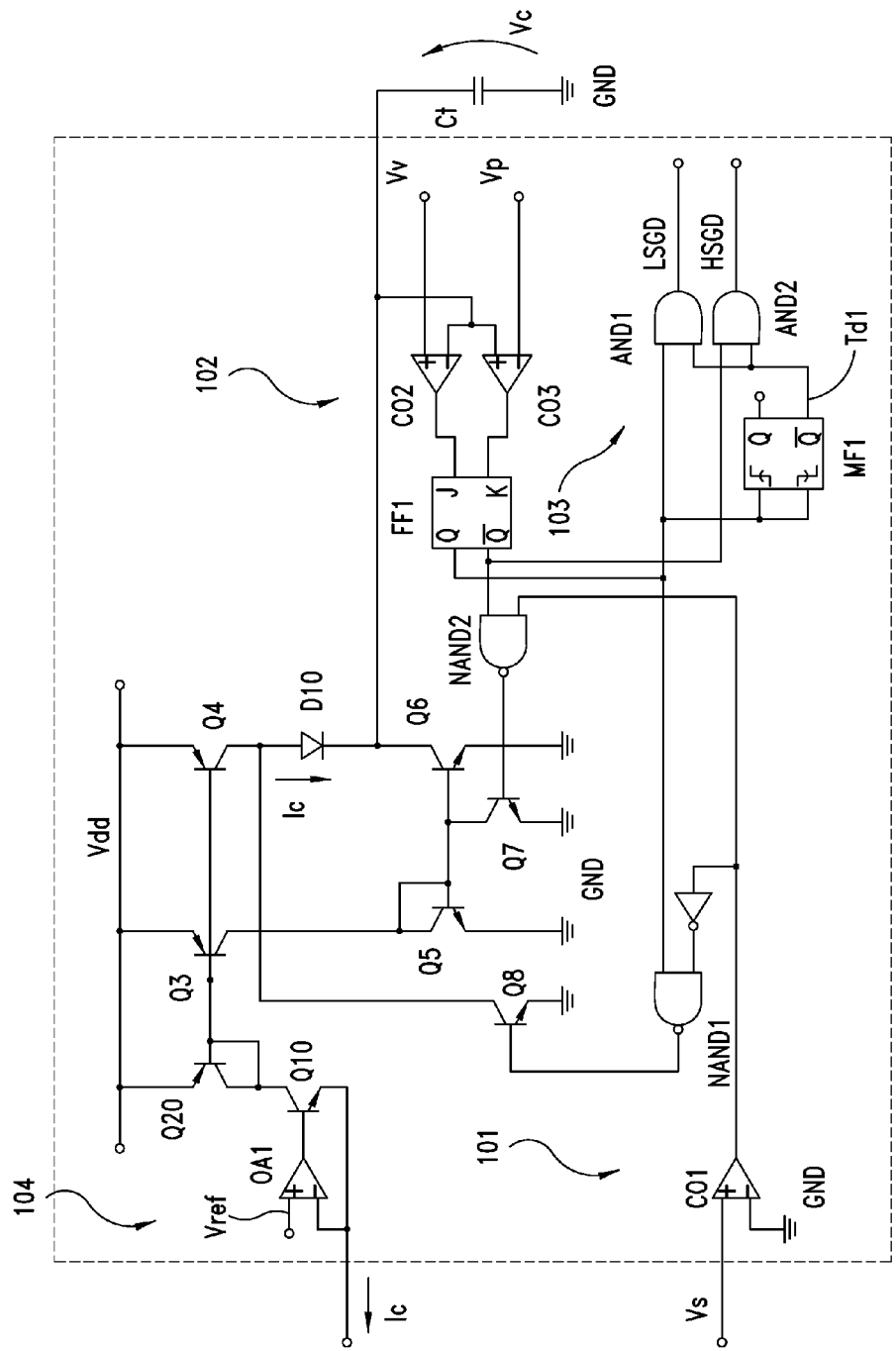
FIG. 4 shows a circuit schematic of a control device for resonant converter in accordance with a first embodiment of the present disclosure.

FIG. 4 shows a circuit schematic of a control device for a resonant converter in accordance with a first embodiment of the present disclosure. For simplicity all the mirrors are assumed to have a mirror rate of 1. The control current Ic (which is modulated by the negative feedback control loop of the output voltage) is taken out from the external pin connected to the inverting terminal of an operational amplifier OA1 having a reference voltage Vref at the non-inverting terminal; the output of the operational amplifier OA1 controls a bipolar transistor Q10 allowing the current Ic to be delivered towards a current mirror consisting of the bipolar transistors Q20-Q3, Q20-Q4. The bipolar transistor Q3 mirrors the current Ic towards another mirror consisting of the bipolar transistors Q5 and Q6, while the bipolar transistor Q4 delivers the current Ic towards the external capacitor Ct; the bipolar transistor Q6 allows the capacitor Ct to be discharged towards ground GND. A diode D10 is connected between the transistors Q4 and Q6 to prevent the discharge current of the capacitor Ct from flowing through the transistor Q4. The operational amplifier OA1 with transistor Q10, the current mirror Q20-Q4 and the transistor Q8 belong to means 104.

First, the voltage across the external capacitor Ct is zero. The comparator CO2, belonging to circuit 102 and adapted to compare the voltage Vc across the capacitor Ct with a reference voltage Vv, sets the SR flip-flop FF1 so that the output Q becomes 1. After a delay of Td1, generated by the monostable device MF1 having the output Q of the flip-flop FF1 at the input, together with the gate AND1, the output LSGD of the gate AND1 becomes high and the transistor Q2 of the half-bridge 200 is switched on.

A comparator CO1, belonging to circuit 101, is adapted to compare the voltage Vs with ground GND. If the output of CO1 is firstly high, the output of the gate NAND1, receiving the denied output of the comparator CO1 and the output Q of the flip-flop FF1 at the input, is thus high. The transistor Q8, connected between transistor Q4 and the ground GND, is switched on and brings the current flowing through the bipolar transistor Q4 to ground.

When the signal Vs becomes negative (there will be parasitic oscillations of the current of the resonant circuit due to the on state of Q1), the output of comparator CO1 will become low, the inputs of the gate NAND1 will be both high and, therefore, the output thereof will become low. The transistor Q8 is switched off and the current mirrored from the transistor Q4 is diverted into the capacitor Ct through the diode D10. On the other hand, the output $\overline{Q}$ of the flip-flop FF1 being low, the output of the gate NAD2 receiving the signal $\overline{Q}$ and the output of the comparator CO1 are high, whereby transistor Q7 connected between the common base terminals of transistors Q5 and Q6 and ground GND, is switched on and keeps the mirror Q5-Q6 switched off. The current Ic from the transistor Q4 will charge the capacitor Ct and an rising voltage ramp of slope Ic/Ct will be observed thereon. Such a ramp is produced from the instant Tstart when the current of the resonant circuit is negative and, i.e., the sign thereof is the same as that of the voltage applied to the resonant circuit itself (negative per se when the transistor Q2 of the half-bridge is switched on).

As soon as the voltage on the capacitor Ct reaches the reference voltage Vp at the time instant T1, the comparator CO3 belonging to circuit 102 and adapted to compare the voltage Vc at the ends of the capacitor Ct with the reference voltage Vp, resets the SR flip-flop FF1 whose output Q becomes zero. This causes the half-bridge to be switched: the output LSGD immediately becomes zero and, after a delay Td1 generated by MF1 together with the gate AND2, the output HSGD of the gate AND2 becomes high, and the transistor Q1 of the half-bridge is switched on. The output of gate NAND1 is forced high and the transistor Q8 is switched on; the current flowing through transistor Q4 is diverted towards the ground GND and the charge ramp of the capacitor Ct is cut off. The inversely biased diode D10 isolates the capacitor Ct thus preventing it from discharging through the transistor Q8. Up to now, the mirror Q5-Q6 was switched off. At the input of the gate NAND2, however, the signal $\overline{Q}$ is now high, whereby the output of the gate depends on the status of the comparator CO1. Due to the conduction period of the transistor Q2 of the half-bridge, the current is negative when the half-bridge is switched, whereby the output of comparator CO1 is still low, the output of the gate NAND2 is high, the transistor Q7 is switched on and the mirror Q5-Q6 is switched off; therefore the current insisting on capacitor Ct is zero and its voltage remains constant at about the value Vp. Due to switching, however, the voltage now applied to the resonant circuit is positive, whereby after a short time also the current of the resonant circuit and the voltage Vs will become positive. The output of CO1 becomes high, that of NAND2 with both inputs high becomes low and the mirror Q5-Q6 switches on taking out a current equal to Ic from the capacitor Ct by discharging it. A descendant voltage ramp of slope −Ic/Ct will be observed thereon. Such a ramp is produced from the instant when the current of the resonant circuit is positive and the sign thereof is the same as that of the voltage applied to the resonant circuit itself (positive per se when the MOSFET Q1 of the half-bridge is switched on).

The discharge proceeds until the voltage Vc on capacitor Ct reaches the value Vv when the comparator CO2 sets the SR flip-flop FF1 again, bringing the output Q thereof high and still switching off the mirror Q5-Q6 and stopping the discharge of capacitor Ct. The output of the gate NAND1 is still high, since the current of the resonant circuit is still positive and the output of comparator CO1 is high, the transistor Q8 is switched on and the diode D10 is inversely biased. Therefore the current insisting on the capacitor Ct is zero and its voltage remains constant at about Vv.

Due to switching, however, the voltage now applied to the resonant circuit is negative whereby, after a short time, the current of the resonant circuit and the voltage Vs will also become negative. The output of comparator CO1 becomes low and, therefore, also that of NAND1, the transistor Q8 is switched off and the current flowing through the transistor Q4 charges the capacitor Ct again, thus starting a new switching cycle. The charging ramp is produced from the instant when the current of the resonant circuit is negative and, i.e., the sign thereof is the same as that of the voltage applied to the resonant circuit itself (negative per se when the MOSFET Q2 of the half-bridge is switched on). The gates AND1 and AND2 belong to circuit 103.

The equation describing the charge of capacitor Ct, in a switching half-period, by denoting with Vv (for example equal to 1V) the downstream voltage of the waveform on the capacitor Ct and Vp (for example equal to 4V) the peak voltage of the waveform, may be written as:

$$Vp = Vv + \frac{1}{Ct}\int_{Td}^{Tsw/2} Ic\, dt$$

wherein Tsw is the switching time period of the transistors Q1 and Q2.

It is inferred therefrom:

$$Tc = \frac{Tsw}{2} - Td = \frac{Vp - Vv}{Ic} Ct.$$

Figure 5:
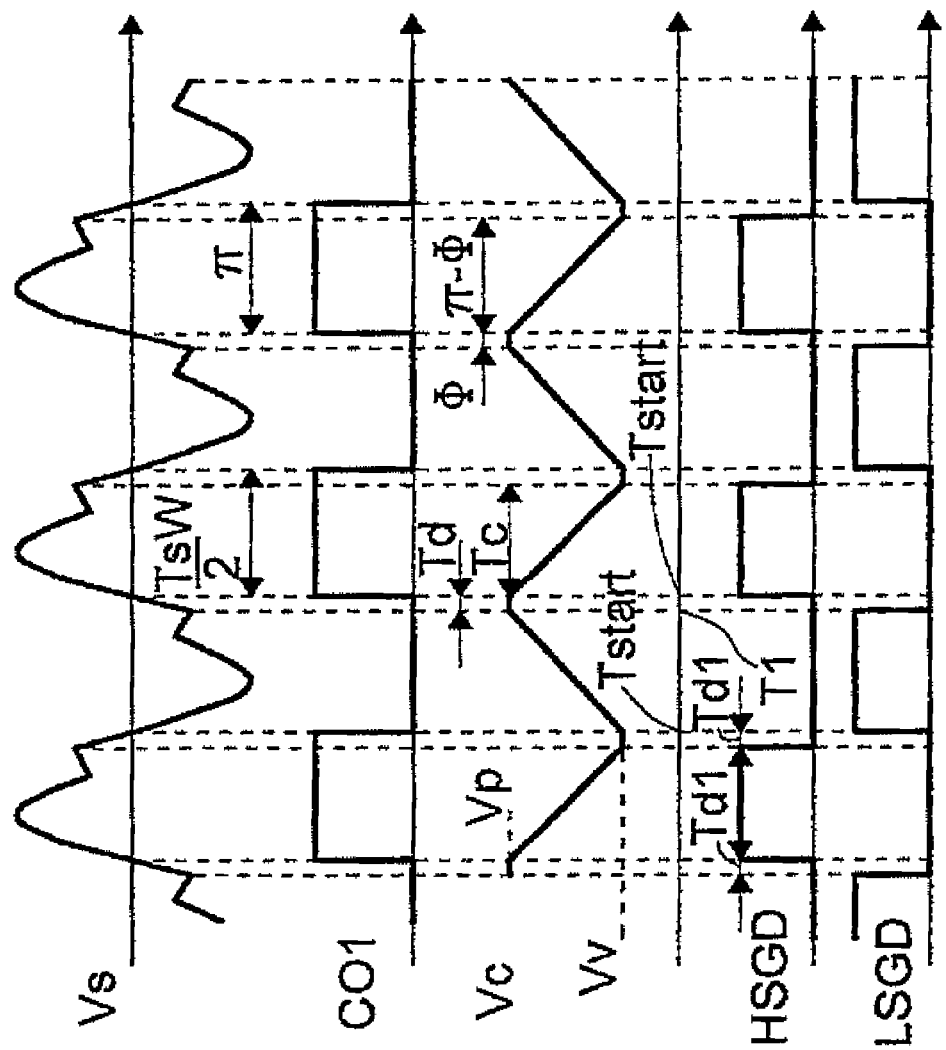
FIG. 5 shows time diagrams of the voltages involved in the device in FIG. 4.

Therefore, the feedback current Ic controls the time distance between the zero crossings of the current of the resonant circuit and the following switching of the half-bridge. By denoting with Φ the phase angle between the resonant current and the voltage of the half-bridge, it is apparent that the control affects the angle π−Φ, thus determining the time Tc=Tsw/2−Td. On the other hand, as it is apparent, the following may be written:

$$\Phi: \pi = Td: \frac{Tsw}{2} \rightarrow \Phi = \pi\frac{Td}{Tsw/2},$$

whereby:

$$\pi - \Phi = \pi\left(1 - \frac{Td}{Tsw/2}\right) = \pi\frac{Tsw/2 - Td}{Tsw/2},$$

and then:

$$Ic = \frac{Qt}{Tsw/2}\frac{\pi}{\pi - \Phi}$$

wherein Qt=(Vp−Vc)Ct is the charge provided to and removed from the capacitor Ct at every cycle. That is to say, the control is not proportional to the phase (or its complement to π), but to the reciprocal thereof, as a scale of the switching period of the half-bridge. FIG. 5 shows the time diagrams of the voltages Vs, Vc, the voltage Vcol at the output of the comparator CO1, and the signals HSGD and LSGD.

Figure 6:
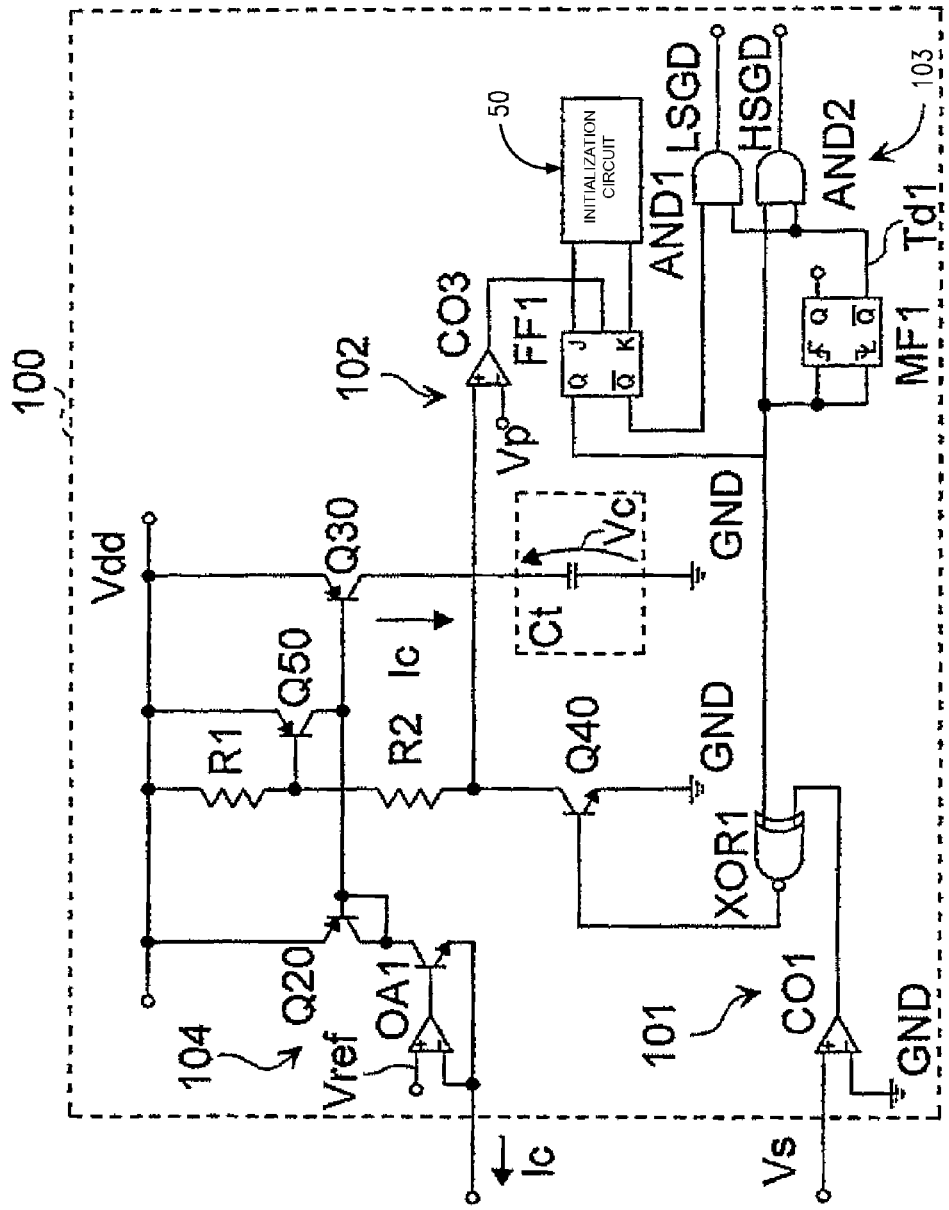
FIG. 6 shows a circuit schematic of a control device for resonant converter in accordance with a second embodiment of the present disclosure.

FIG. 6 shows a circuit schematic of a control device for a resonant converter in accordance with a second embodiment of the present disclosure. The same elements as the circuit schematic of the device in FIG. 4 will have the same reference numerals. The control current Ic (which is modulated by the negative feedback control loop of the output voltage) is taken out from the external pin connected to the inverting terminal of an operational amplifier OA1 having a reference voltage Vref at the non-inverting terminal. The output of the operational amplifier OA1 controls a bipolar transistor Q10 allowing the current Ic to be delivered towards a current mirror consisting of the bipolar transistors Q20-Q30 connected to the supply voltage Vdd. When the mirror Q20-Q30 is switched on, i.e., when the bipolar transistor Q50 having the collector and emitter terminals coupled between the supply voltage Vdd and the base terminal of transistors Q20 and Q30 is off, the mirror Q20-Q30 mirrors the current Ic towards the external capacitor Ct thus allowing the latter to be charged. When it is switched on, transistor Q40 allows the capacitor Ct to be quickly discharged towards the ground GND while switching off the mirror Q20-Q30 to reduce the overall current consumption. This last task is not essential for the operation of the circuit. The operational amplifier OA1 with transistor Q10, the current mirror Q20-Q30 and the transistor Q40 belong to means 104.

Firstly, the voltage Vc on the external capacitor Ct is zero. The initialization circuit 50 sets up the inputs J and K of the flip-flop FF1 to 0 and 1, respectively, so that the output Q thereof is low (and, therefore, the complementary $\overline{Q}$ thereof is high), then it sets J=K=1. Thereby, from now, the flip-flop FF1 will act as a Toggle at every positive edge applied to its asynchronous input from the comparator CO3, belonging to means 102, adapted to compare the voltage Vc across the capacitor Ct with the reference voltage Vp. $\overline{Q}$ being asserted high, after a delay of Td1 performed by the monostable device MF1 having the output Q of the flip-flop FF1 at the input, together with the gate AND1, the output LSGD becomes high and the transistor Q2 of the half-bridge 200 is switched on. If the output of the comparator CO1 belonging to means 101 is firstly high, the output of the OR-exclusive port XOR1 receiving the output of comparator CO1 and the output Q of flip-flop FF1 at the input is thus high. The bipolar transistor Q40, which is connected between the supply voltage Vdd by means of the series of two resistances R1 and R2 and the ground GND, is switched on and the transistor Q50 having the base terminal connected to the common terminal of the two resistances R1 and R2 is also switched on, so that the mirror Q20-Q30 is switched off and the capacitor Ct is not charged.

When the signal Vs becomes negative (there will be parasitic current oscillations of the resonant circuit due to Q1 being switched on), the output of the comparator CO1 will become low, the inputs of the gate XOR1 will be both high and, therefore, the output thereof will become low. Transistor Q40 is switched off, transistor Q50 is switched off accordingly, and mirror Q20-Q30 is switched on, so that the current flowing through transistor Q30 charges the capacitor Ct and an ascendant voltage ramp of slope Ic/Ct will be observed thereon. Such a ramp is produced from the instant when the current of the resonant circuit is negative and, i.e., the sign thereof is the same as that of the voltage applied to the resonant circuit itself (negative per se when the transistor Q2 of the half-bridge is switched on).

As soon as the voltage Vc on the capacitor Ct reaches the reference voltage Vp, the output of comparator CO3 becomes high thus inverting the status of the outputs of flip-flop FF1, whose output Q becomes one (and $\overline{Q}$ becomes zero). This causes the half-bridge to be switched: the output LSGD immediately becomes zero and, after a delay Td1 generated by the monostable device MF1 together with the gate AND2, the output HSGD becomes high, and the transistor Q1 of the half-bridge 200 is switched on. The signal Vs is still negative, whereby the output of comparator CO1 is low and the output of gate XOR1 is forced high and therefore the transistor Q40 is switched on, thus quickly discharging the capacitor Ct to zero. At the same time, the transistor Q40 also switches on the transistor Q50 which switches off the mirror Q20-Q30. This situation is kept as long as the voltage Vs remains negative.

Due to switching, however, the voltage now applied to the resonant circuit is positive whereby, after a short time, the current of the resonant circuit will also become positive, as well as the voltage Vs. The output of comparator CO1 becomes high, that of gate XOR1, with both inputs being high, becomes low, the transistors Q40 and Q50 switch off and the mirror Q20-Q30 switches on thus charging the capacitor Ct with the current Ic. An ascendant voltage ramp of slope Ic/Ct will be observed thereon. Such a ramp is produced from the instant when the current of the resonant circuit is positive and, i.e., the sign thereof is the same as that of the voltage applied to the resonant circuit itself (positive per se when the transistor Q1 of the half-bridge is switched on).

The discharge proceeds until the voltage across the capacitor Ct reaches the value Vp once again, and the output of CO3 becomes high, therefore inverting the status of the outputs of FF1, whose output Q becomes zero (and $\overline{Q}$ becomes one). This causes the half-bridge to be switched: the output HSGD immediately becomes zero and, after a delay Td generated by MF1 together with the gate AND1, the output LSGD becomes high, and the transistor Q2 of the half-bridge is switched on. The voltage signal Vs is still positive, whereby the output of CO1 is high and the output of the port XOR1 is forced high and therefore the transistor Q40 is switched on, thus quickly discharging the capacitor Ct to zero. At the same time, the transistor Q40 also switches on the transistor Q50 which switches off the mirror Q20-Q30. This situation is kept as long as the voltage Vs remains positive.

Due to switching, however, the voltage now applied to the resonant circuit is negative whereby, after a short time, the current of the resonant circuit will also become negative, as well as the voltage Vs. The output of comparator CO1 becomes low and, therefore, also that of the gate NAND1; the transistor Q40 is switched off and the current flowing on transistor Q30 charges the capacitor Ct again, therefore starting a new switching cycle. Once again, the charge ramp is produced from the instant when the current of the resonant circuit is negative and, i.e., the sign thereof is the same as that of the voltage applied to the resonant circuit itself (negative per se when the transistor Q2 of the half-bridge is switched on). The gates AND1 and AND2 belong to means 103.

Even in this case, the feedback current Ic controls the time distance between the zero crossings of the current of the resonant circuit and the following switching of the half-bridge. The equations describing the operation of this circuit are exactly the same as those given for the circuit in FIG. 4.

Figure 7:
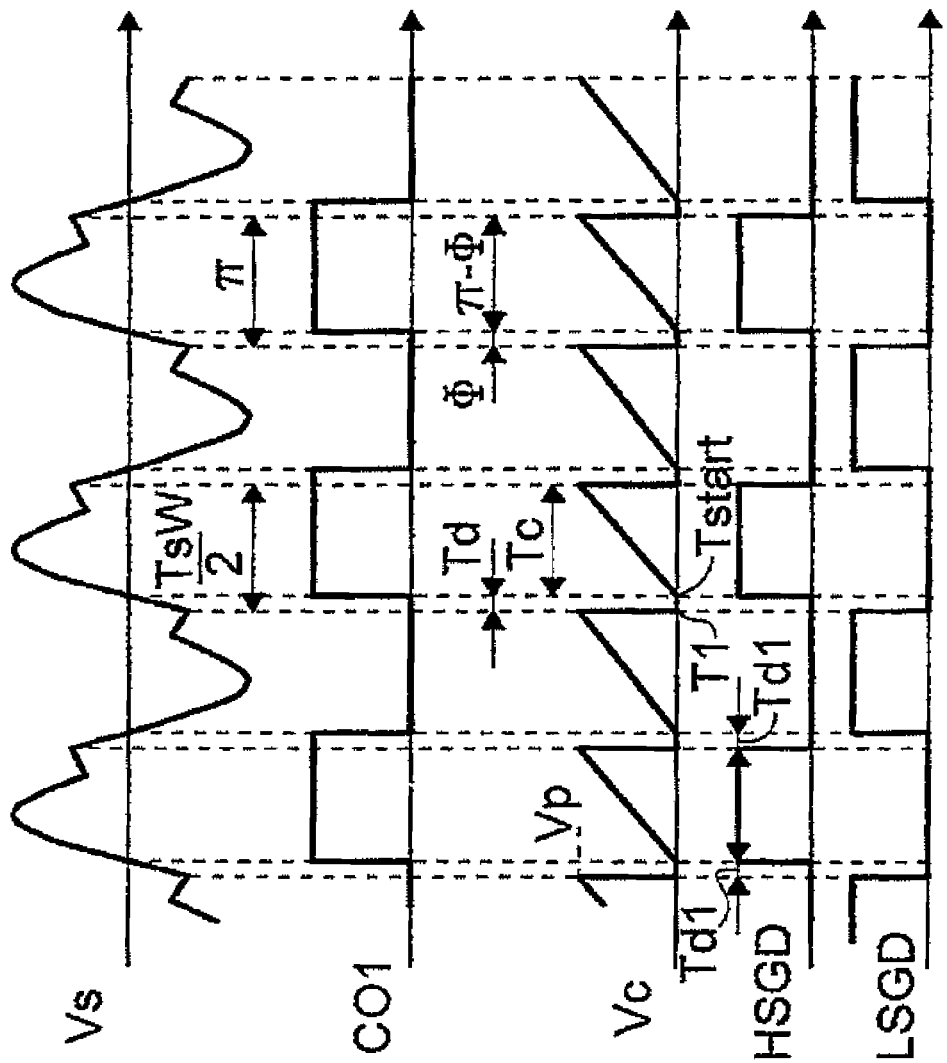
FIG. 7 shows time diagrams of the voltages involved in the device in FIG. 6.

FIG. 7 shows the time diagrams of voltage Vs, Vc, voltage Vcol at the output of the comparator CO1, and signals HSGD and LSGD.

Figure 8:
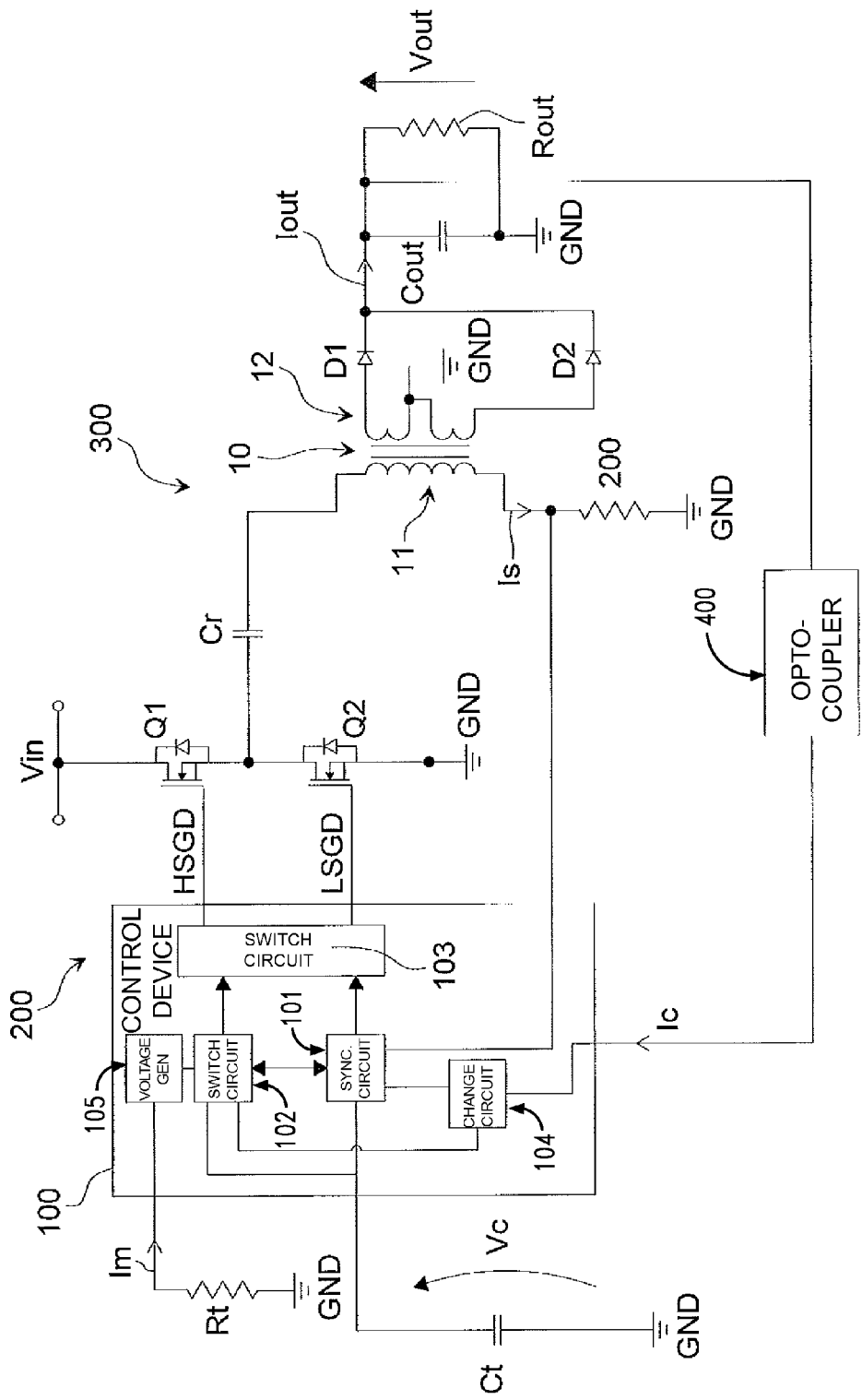
FIG. 8 shows a circuit schematic of a resonant converter with control device in accordance with the present disclosure.

In accordance with another aspect of the present disclosure, FIG. 8 shows a resonant converter with a control device 100 in which like reference numbers are used for like elements from the previous embodiments. The control device 100 controls a switching circuit of the resonant converter; the switching circuit includes at least one half-bridge 200 of at least first Q1 and second Q2 transistors connected between an input voltage Vin and a reference voltage, preferably ground GND. The half-bridge 200 is adapted to generate a periodic square wave voltage ranging from a high voltage, corresponding to the input voltage Vin, to a low voltage, corresponding to the reference voltage GND; the half-bridge 200 drives a resonant circuit 300, preferably including a series of a capacitor Cr and a transformer 10 having a primary 11 and a center-tap secondary 12. The two windings of the center-tap secondary 12 of transformer 10 are connected to the anodes of two diodes D1 and D2 whose cathodes are both connected to the parallel of a capacitor Cout and a resistance Rout. The output voltage Vout of the resonant converter is present at the ends of the parallel Rout, Cout while the output current Iout flows through Rout.

The control device 100 is adapted to control the half-bridge 200 according to the time period of charging a capacitor Ct outside the control device. The control device 100 is normally integrated in a silicon chip or substrate. The control device 100 alternately controls the switching on and off of the transistors Q1 and Q2; and the control device 100 controls the switching on of transistor Q1 or transistor Q2 and the respective switching off of transistor Q2 or transistor Q1 according to the time period Tc of charging the external capacitor Ct.

The control device 100 also includes a circuit means 101 adapted to synchronize the starting time instant Tstart of the time period Tc of charging the capacitor Ct with the zero crossing of a signal Vs representative of the current Is flowing through the resonant circuit, in particular the voltage signal across the resistance Rs arranged between the primary 11 of transformer 10 and ground GND. The device 100 further includes a circuit 105 adapted to generate a voltage Vpp having a value proportional to the duration of a switching period Tsw, and circuits 102, 104 adapted to charge and discharge the capacitor Ct between a reference voltage, preferably GND, and the voltage Vpp.

The circuits 102, 103 are adapted to control the switching off of the first Q1 or second Q2 transistor of the half-bridge at the end of the time period of charging or discharging the comparator Ct. Circuit 103 is particularly adapted to control the switching off of the first Q1 or second Q2 transistor of the half-bridge at the time instant T1 where the voltage at the terminals of the capacitor reach the voltage Vpp. The circuit 103 is preferably adapted to control the switching off of transistor Q1 at the end of time period Tc of charging the external capacitor Ct, and the switching off of transistor Q2 at the next time period Tc of charging the external capacitor Ct in a switching cycle Tsw. Circuit 103 drives the transistors Q1 and Q2 by the signals HSGD and LSGD.

The signal Ic representative of the output voltage Vout or the output current Iout is preferably carried at the device 100 by an isolated coupler 400, for example an opto-coupler. The current signal Ic is preferably directly or indirectly used to charge or discharge capacitor Ct from the circuit 104.

Figure 9:
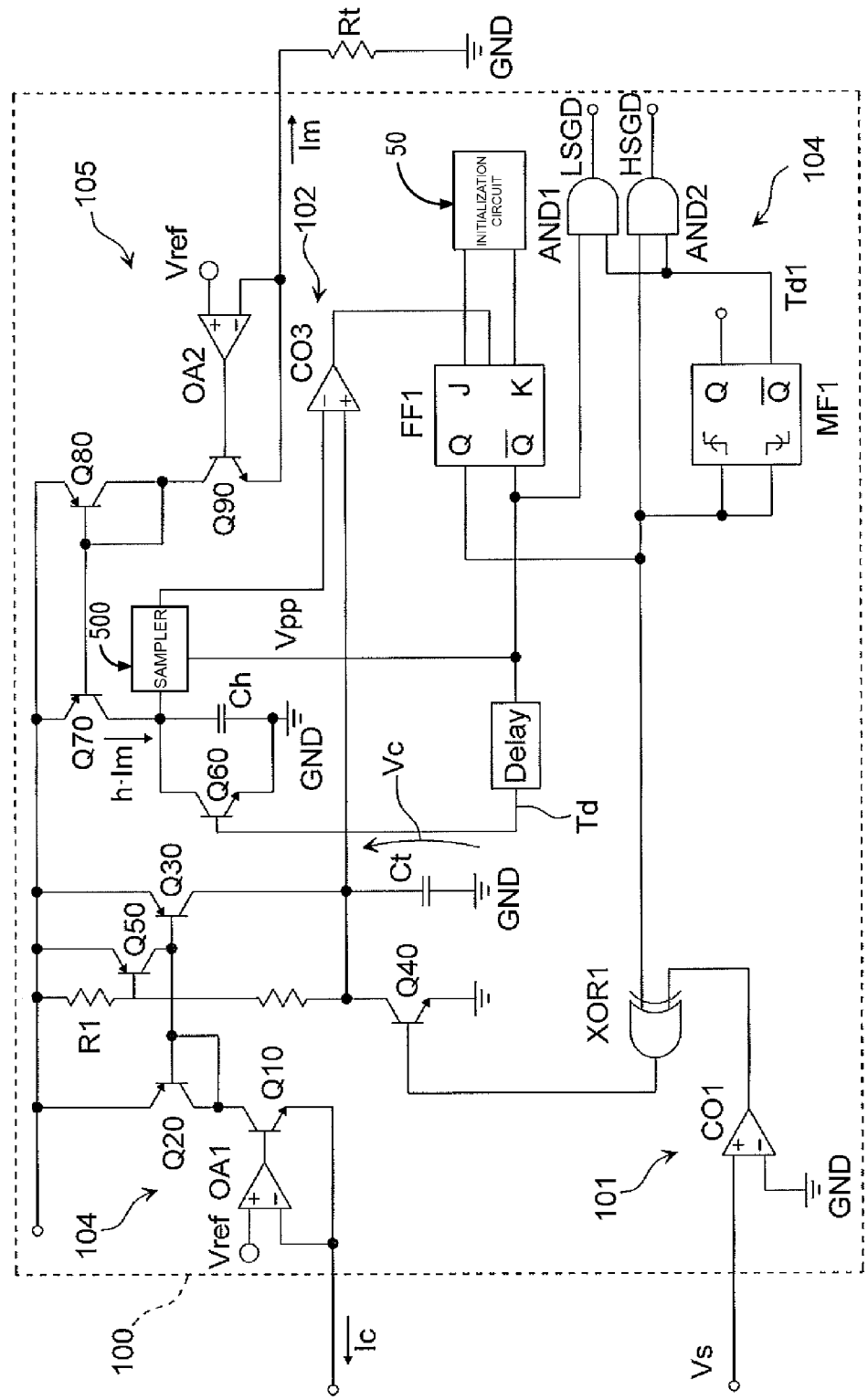
FIG. 9 shows a circuit schematic of a control device for resonant converter in accordance with a first embodiment of the present disclosure.

FIG. 9 shows a diagram of a control device for a resonant converter in accordance with the third embodiment of the present disclosure. For simplicity, all current mirrors are assumed to have a mirroring ratio of 1. The control current Ic (which is modulated by the control loop of the output voltage with negative feedback) is taken out from the external pin connected to the inverting terminal of an operational amplifier OA1 having a reference voltage Vref at the non-inverting terminal; the output of the operational amplifier OA1 controls a bipolar transistor Q50 allowing the current Ic to be delivered towards a current mirror consisting of the bipolar transistors Q20-Q30 connected to the supply voltage Vdd. When mirror Q20-Q30 is on, i.e., when the bipolar transistor Q50 having the collector and emitter terminals coupled between the supply voltage Vdd and the base terminal of transistors Q20 and Q30 is off, it mirrors the current Ic towards external capacitor Ct, thus allowing the latter to be charged. When transistor Q40 is on, it allows capacitor Ct to be quickly discharged to ground GND while switching off mirror Q20-Q30 for reducing the overall current consumption. The latter task is not essential for the operation of the circuit. The operational amplifier OA1 with transistor Q10, the current mirror Q20-Q30 and the transistor Q40 belong to circuit 104.

First the voltage Vc on external capacitor Ct is zero. The initialization circuit 50 sets inputs J and K of a flip-flop FF1 to 0 and 1, respectively, so as the output Q thereof is low (and, therefore, the complementary $\overline{Q}$ thereof is high), then J=K=1 is set. Thereby, from now on, flip-flop FF1 will operate as a Toggle at every positive edge applied to the asynchronous input thereof by the comparator CO3, belonging to means 102, adapted to compare the voltage Vc across the capacitor C with the voltage Vpp. With $\overline{Q}$ high, after a delay equal to Td1, performed by the monostable device MF1 having at the input the output Q of flip-flop FF1, along with the gate AND1, the output LSGD becomes high and the transistor Q2 of half-bridge 200 is switched on. If the output of comparator CO1, belonging to means 101, is firstly high, the output of the exclusive-OR gate X-OR1 receiving at the input the output of comparator CO1 and the output Q of flip-flop FF1 is thus high. The bipolar transistor Q40, which is connected between supply voltage Vdd by the series of two resistances R1 and R2 and ground GND, is switched on as well as the transistor Q50 having the base terminal connected to the common terminal of the two resistances R1 and R2, so that mirror Q20-Q30 is switched off and the capacitor Ct is not charged.

When signal Vs becomes negative (there will be parasitic current oscillations of the resonant circuit due to Q1 being switched on), the output of comparator CO1 will become low, the inputs of the gate XOR1 will be both high and, therefore, the output thereof will become low. Transistor Q40 is switched off, transistor Q50 is switched off as well, and mirror Q20-Q30 is switched on, so that the current flowing through transistor Q30 charges capacitor Ct and an ascendant voltage ramp of slope Ic/Ct will be observed thereon. Such a ramp is produced from the instant when the current of the resonant circuit is negative and, i.e., the sign thereof is the same as that of the voltage applied to the resonant circuit itself (negative per se when the transistor Q2 of the half-bridge is switched on).

As soon as voltage Vc on the capacitor Ct reaches voltage Vpp, the output of comparator CO3 becomes high thus inverting the status of the outputs of flip-flop FF1, the output Q of which becomes one (and $\overline{Q}$ becomes zero). This causes the half-bridge to be switched: the output LSGD immediately becomes zero and, after a delay Td1 generated by the monostable device MF1 together with the gate AND2, the output HSGD becomes high, and transistor Q1 of the half-bridge 200 is switched on. The signal Vs is still negative, whereby the output of comparator CO1 is low and the output of the gate XOR1 is forced high and therefore the transistor Q40 is switched on, thus quickly discharging the capacitor Ct to zero. At the same time, the transistor Q40 also switches on the transistor Q50 which switches off the mirror Q20-Q30. This situation is kept as long as voltage Vs remains negative.

Due to switching, however, the voltage now applied to the resonant circuit is positive whereby, after a short time, the current of the resonant circuit will also become positive, as well as the voltage Vs. The output of comparator CO1 becomes high, that of the gate XOR1, with both inputs being high, becomes low, the transistor Q40 and Q50 switch off and the mirror Q20-Q30 switches on thus charging the capacitor Ct with the current Ic. An ascendant voltage ramp of slope Ic/Ct will still be observed thereon. Such a ramp is produced from the instant when the current of the resonant circuit is positive and, i.e., the sign thereof is the same as that of the voltage applied to the resonant circuit itself (positive per se when transistor Q1 of the half-bridge is switched on).

The charge proceeds until the voltage on capacitor Ct reaches the value Vpp once again, and the output of CO3 becomes high, therefore inverting the status of the outputs of FF1, whose output Q becomes zero (and $\overline{Q}$ becomes one). This causes the half-bridge to be switched: the output HSGD immediately becomes zero and, after a delay Td generated by MF1 together with the gate AND1, the output LSGD becomes high, and transistor Q2 of the half-bridge is switched on. The voltage signal Vs is still positive, whereby the output of CO1 is high and the output of the gate XOR1 is forced high and therefore the transistor Q40 is switched on, thus quickly discharging capacitor Ct to zero. At the same time, the transistor Q40 also switches on the transistor Q50 which switches off the mirror Q20-Q30. This situation is kept as long as the voltage Vs remains positive.

Due to switching, however, the voltage now applied to the resonant circuit is negative whereby, after a short time, the current of the resonant circuit will also become negative, as well as the voltage Vs. The output of comparator CO1 becomes low and, therefore, that of port XOR1 as well; the transistor Q40 is switched off and the current flowing on transistor Q30 charges the capacitor Ct again, therefore starting a new switching cycle. Once again, the charging ramp is produced from the instant when the current of the resonant circuit is negative and, i.e., the sign thereof is the same as that of the voltage applied to the resonant circuit itself (negative per se when transistor Q2 of the half-bridge is switched on). The gates AND1 and AND2 belong to means 103.

Even in this case, the feedback current Ic controls the time distance between the zero crossings of the current of the resonant circuit and the following switching of the half-bridge.

Voltage Vpp is produced by the circuit 105 adapted to proportionally generate the signal Vpp to the switching period Tsw.

Circuit 105 includes an operational amplifier OA2 having a reference voltage Vref at the non-inverting terminal while the inverting terminal is connected to an external pin connected to an external resistance Rt and from which the current Im=Vref/Rt is taken out; the output of operational amplifier OA2 controls a bipolar transistor Q90 allowing the current Im to be delivered towards a current mirror consisting of the bipolar transistors Q80-Q70 connected to the supply voltage Vdd, and adapted to mirror the current Im with a mirroring ratio h towards a capacitor Ch, connected between the collector terminal of transistor Q70 and ground GND, thus allowing the latter to be charged when a bipolar transistor Q60, having collector and emitter terminals connected to the terminal of capacitor Ch, is switched off. The base terminal of transistor Q60 is controlled by the signal $\overline{Q}$ which is at the output from the flip-flop FF1; this occurs when the output $\overline{Q}$ of flip-flop FF1 is low, i.e. over all the time between the moment when signal LSGD becomes low and the moment when signal HSGD becomes low, essentially corresponding to the first half of the switching period Tsw. The current h*Im is diverted, instead, towards ground when transistor Q60 is switched on, which occurs when the output $\overline{Q}$ of flip-flop FF1 is high, i.e. over all the time between the instant when signal HSGD becomes low and the instant when signal LSGD becomes low, essentially corresponding to the second half of the switching period Tsw.

Accordingly, a voltage ramp during half of the switching cycle will be observed on capacitor Ch, where signal HSGD is high (and Q60 is off), while the voltage will substantially remain null in the other half of the switching cycle, that in which the signal LSGD is high (and Q60 is on).

The circuit 105 further includes a sampler 500 whose control input, sensitive to the positive edges, is driven by signal and adapted to sample the voltage across the capacitor Ch.

Figure 10:
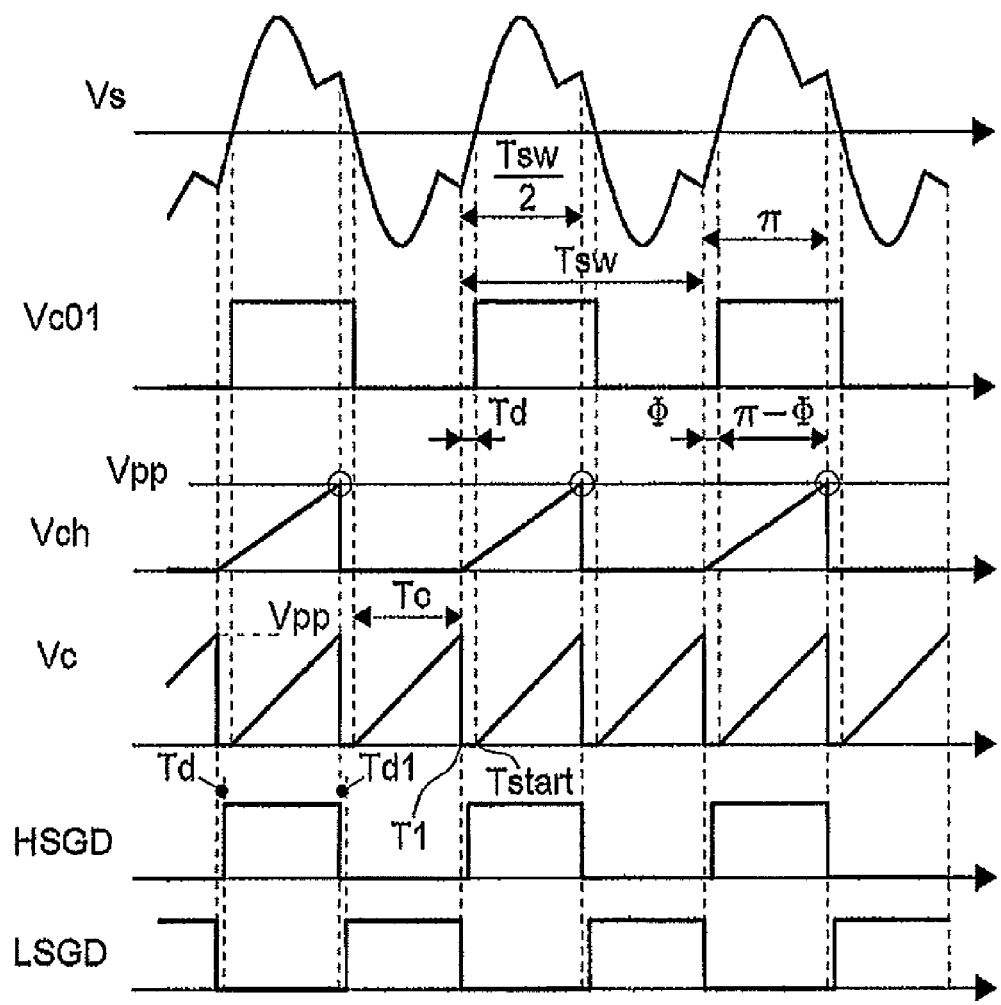
FIG. 10 shows some time diagrams of the relevant voltages in the device of FIG. 9.

Referring to FIG. 10, where time charts of voltages Vs, Vc, voltage Vcol at the output of comparator CO1, signals HSGD and LSGD, voltage Vpp and voltage Vch across the comparator Ch are shown, the voltage across the capacitor Ct in the switching half-period where transistor Q60 is off is the following:

$$Vch(t) = \frac{h \text{Im}}{Ch}t = h\frac{Vref}{RtCh}t$$

and the peak value thereof is reached at the end of the switching half-cycle Tsw/2, when signal $\overline{Q}$ becomes high:

$$Vch\left(\frac{Tsw}{2}\right) = \frac{1}{2}h\frac{Vref}{RtCh}Tsw.$$

In that same instant, sampler 500 samples the voltage across the capacitor Ch. Therefore.

$$Vpp = Vch\left(\frac{Tsw}{2}\right) = \frac{1}{2}h\frac{Vref}{RtCh}Tsw.$$

The voltage Vpp is thus a DC level proportional to the switching period Tsw.

It should be noted that the transistor Q6 discharging capacitor Ch is switched on with a short delay Td given by a block Delay with respect to the sampling moment, in order to avoid errors.

It should be also noted that the system just described actually measures the duration of a switching half-period and the value is used again in the next half-period. The modifications to the above-described circuit, in the case of measuring the whole switching cycle or each half-cycle, are obvious to a person skilled in the art and will not be described herein. The equation describing the charge of capacitor Ct in each switching half-period, again with reference to the diagrams in FIG. 5, may be written as:

$$Vpp = \frac{k}{Ct}\int_{Td}^{\frac{Tsw}{2}} Icdt$$

from which:

$$\frac{Tsw}{2} - Td = k\frac{Vpp}{Ic}Ct$$

and solving it with respect to Ic, and using a previous equation it may be written:

$$Ic = kCt\frac{Vpp}{Tsw/2 - Td} = \frac{h}{k}\frac{Vref}{Rt}\frac{Ct}{Ch}\frac{Tsw/2}{Tsw/2 - Td}.$$

By denoting with $\Phi$ the phase angle between the resonant current and the voltage of the half-bridge (positive, because the current is late with respect to the voltage, as shown in FIG. 5), the following may be written:

$$\Phi: \pi = Td: \frac{Tsw}{2} \rightarrow \phi = \pi\frac{Td}{Tsw/2},$$

whereby:

$$\pi - \Phi = \pi\left(1 - \frac{Td}{Tsw/2}\right) = \pi\frac{Tsw/2 - Td}{Tsw/2}$$

whereby $$Ic = \frac{h}{k}\frac{Vref}{Rt}\frac{Ct}{Ch}\frac{1}{1 - \Phi/\pi}.$$

The latter equation asserts that the control is not proportional to the phase (or its complement to $\pi$), but to $1/(1-\Phi/\pi)$.

Through the latter equation and by limiting the variability range of current Ic, which may be very easily done by using resistances, that of $\Phi$ is limited. It is easily verified that, the phase ranging between 0 and 90° (0, $\pi/2$ rad), the ratio between the extreme values of current Ic is 2.

In the construction on a silicon integrated circuit, the mirror factors h and k should not preferably be chosen as being too different from each other, possibly equal: thereby, exploiting "matching" techniques, although they have individual values of considerable static dispersions, their ratio has instead a very small static dispersion. The same is true for capacities Ct and Ch, which may conveniently be chosen as equal to each other. As the accuracy of the voltage reference is also high and the low tolerance resistances are now easy to be found and cost-effective, the link between the control value and the phase $\Phi$ expressed by the last equation may thus have a high degree of accuracy.

The various embodiments described above can be combined to provide further embodiments. All of the U.S. patents, U.S. patent application publications, U.S. patent application, foreign patents, foreign patent application and non-patent publications referred to in this specification and/or listed in the Application Data Sheet are incorporated herein by reference, in their entirety. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A control device for a resonant circuit, the control device comprising:
a first circuit configured to start a time period of discharging or charging a capacitor in response to a zero crossing of a signal representative of current flowing through the resonant circuit; and a control circuit configured to control a switching off of a first or a second transistor of a half-bridge circuit in response to an ending of the time period of discharging or charging the capacitor, the control circuit including:
a second circuit configured to limit voltage at terminals of the capacitor between a minimum value and a maximum value; and
a third circuit configured to control the switching off of the first or the second transistor of the half-bridge circuit in response to determining that the voltage at the terminals of the capacitor reaches the maximum value or the minimum value.

2. The control device of claim 1, comprising a fourth circuit structured to charge or discharge the capacitor with a current depending on a DC output current of the resonant circuit.

3. The control device of claim 2, wherein:
the fourth circuit includes:
current mirrors configured to charge the capacitor; and
transistors configured to discharge the capacitor;
the first circuit includes a comparator configured to compare the signal representative of the current flowing through the resonant circuit with a ground reference potential and to control the current mirrors for charging the capacitor and the transistors for discharging it as a result of the comparison; and
the second circuit includes comparators configured to compare the voltage across the capacitor with at least a first reference voltage or a second reference voltage.

4. The control device of claim 1, wherein the third circuit is configured to control the switching off of the first transistor at the end of the time period of discharging the capacitor and the switching off the second transistor at the end of the time period of charging the capacitor.

5. The control device of claim 1, wherein the third circuit is configured to control the switching off of the first transistor at the end of the time period of charging the capacitor and the switching off of the second transistor at the end of the next time period of charging the capacitor.

6. The control device of claim 1, wherein the device is integrated in a silicon substrate, and wherein the capacitor is outside the control device.

7. The device of claim 1, wherein the resonant circuit comprises a transformer with a primary winding and at least one secondary winding and a resonant capacitor arranged in series with the primary winding, the current flowing through the resonant circuit comprising the current flowing through the primary winding.

8. A method of controlling a switching circuit for a resonant circuit, the method comprising:
initiating a starting time instant of a time period of discharging or charging a capacitor in response to a zero crossing of a signal representative of current flowing through the resonant circuit;
limiting a voltage across the capacitor between a minimum value and a maximum value; and
switching off the first transistor in response to the voltage across the capacitor reaching the maximum voltage and switching off the second transistor in response to the voltage across the capacitor reaching the minimum value.

9. The method of claim 8, comprising charging or discharging the capacitor with a current depending on a DC output current of the resonant converter.

10. The method of claim 8, comprising comparing the signal indicating current flowing in the resonant circuit with a ground reference value and controlling a plurality of current mirrors to charge the capacitor and a plurality of transistors to discharge the capacitor.

11. A circuit, comprising:
a switching circuit for a resonant circuit, the switching circuit including:
a control circuit configured to control a switching on and off of first and second transistors coupled to the resonant circuit, the control circuit including:
a first circuit configured to start a time period of charging and discharging a capacitor in response to a zero crossing of a signal representative of current flowing in the resonant circuit;
a second circuit configured to limit voltage at terminals of the capacitor between a minimum value and a maximum value; and
a third circuit configured to control a switching off and switching on of the first and second transistors in response to the voltage at the terminals of the capacitor reaching the minimum value or maximum value.

12. The circuit of claim 11, comprising a fourth circuit configured to control charging and discharging of the capacitor with a current that is a mirror of the current flowing in the resonant circuit.

13. The circuit of claim 12, wherein the third circuit includes a voltage limit circuit configured to limit the voltage at the terminals of the capacitor between the minimum value and the maximum value that is higher than the minimum value, with the maximum value constituting a first reference voltage and the minimum value constituting a second reference voltage.

14. The circuit of claim 13, wherein the third circuit is configured to control the switching off of the first transistor in the half bridge circuit in response to an end of the time period of discharging the capacitor and the switching off of the second transistor in the half bridge circuit in response to an end of the time period of charging the capacitor.

15. The circuit of claim 13, wherein the third circuit is configured to control the switching off of the first transistor in the half bridge circuit in response to an end of the time period of charging the capacitor and the switching off of the second transistor in the half bridge circuit in response to an end of a next time period of charging the capacitor.

16. The circuit of claim 11, comprising a fourth circuit configured to charge or discharge the capacitor with a current that depends on a DC output current of the resonant circuit.

17. The circuit of claim 16, wherein the fourth circuit comprises a plurality of current mirrors that charge the capacitor and a plurality of transistors that discharge of the capacitor.

18. The circuit of claim 17, wherein the first circuit comprises a synchronizing circuit having a comparator configured to compare the signal indicating current flowing in the resonant circuit with a ground reference potential and to generate a comparison signal that is configured to control the plurality of current mirrors to charge the capacitor and the plurality of transistors to discharge the capacitor.

19. The circuit of claim 11, comprising a silicon substrate on which the control circuit is formed, and wherein the capacitor is formed outside the silicon substrate.

20. A switching circuit for a resonant converter having a direct current at the output, the switching circuit comprising:
at least one half-bridge circuit of at least first and second transistors connected between an input voltage and a reference voltage, the half bridge structured to generate a periodic square wave voltage to drive a resonant circuit for the resonant converter, the periodic square wave voltage ranging from a high voltage corresponding to the input voltage, and a low voltage corresponding to the reference voltage;

a control device structured to control the half-bridge according to a time period of charging a capacitor; the control device including:

a synchronizer circuit adapted to initiate a starting time instant of a time period of charging the capacitor in response to a zero crossing of a signal indicating current flowing through the resonant circuit;

a switch control circuit configured to control the switching off of the first or the second transistor in response to an end of the time period of charging the capacitor, the switch control circuit structured to control the switching off of the first or second transistor of the half-bridge circuit at a time instant in which a voltage at the ends of the capacitor has reached the first voltage;

a generator circuit configured to generate a first voltage, the generator circuit including a further capacitor charged by a further current for a switching half-period and a device to discharge the further capacitor for a next switching half-period, a sampler circuit powered by the further voltage at the ends of the further capacitor and adapted to sample the further voltage at every final instant of the switching half-period for charging the further capacitor, the sampler circuit configured to supply the first voltage; and a voltage limiter circuit adapted to limit a voltage across the capacitor between the reference voltage and the first voltage.

21. The circuit according to claim 20, wherein the device that discharges the further capacitor is a switch that is substantially closed at every final instant of the switching half-period for charging the further capacitor and for the next switching half-period.

22. The circuit according to claim 21, wherein the further current is given by a ratio of a further reference voltage to a resistance.

23. The circuit according to claim 21 wherein: the generator circuit includes current mirrors adapted to allow the capacitor to be charged, and transistors adapted to allow the capacitor to be discharged, and in that the synchronizer circuit includes a first comparator adapted to compare the signal indicating the current flowing in the resonant circuit with the ground and to control the current mirrors for charging the capacitor and the transistors for discharging the capacitor, and further including a second comparator adapted to compare the voltage at the ends of the capacitor with the first voltage, a flip-flop operating as a toggle at every positive edge of the output signal to the second comparator, the negated output signal of the flip-flop being the control signal of the sampler and of the device discharging the further capacitor.

24. The circuit according to claim 23, comprising a circuit to delay the control signal of the device discharging the further capacitor with respect to the control signal of the sampler circuit.

25. The circuit according to claim 20, comprising another circuit structured to charge or discharge the capacitor with a current depending on the output direct current of the resonant converter, the resonant converter comprising a transformer with a primary winding and at least a secondary winding and a resonant capacitor arranged in series with the primary winding, the current flowing in the resonant circuit comprising the current flowing in the primary winding.

26. The circuit according to claim 20, wherein the switch control circuit is structured to control the switching off of the first transistor at the end of the time period of charging the capacitor and the switching off of the second transistor at the end of the next time period of charging of the capacitor in a switching cycle.

27. The circuit of claim 20 wherein the switch control circuit is integrated in a silicon chip that includes the control device for the resonant converter, and further wherein the capacitor and the resistance are outside the integrated circuit.

28. A system, comprising:

a resonant circuit having a half bridge circuit that includes first and second transistors;

a control circuit configured to control a time period of charging a capacitor coupled to the resonant circuit, the control circuit including:

a first circuit configured to initiate a time period of charging the capacitor at a start time in response to a crossing of a zero value of a signal that indicates current flowing in the resonant circuit; and a second circuit configured to limit voltage at terminals of the capacitor between a minimum value and a maximum value; and a third circuit configured to control a switching off and switching on of the first and second transistors in the resonant circuit in response to the voltage at the terminals of the capacitor reaches the minimum value or maximum value.

29. The system of claim 28, wherein the control circuit is configured to control the half bridge circuit so that the half bridge circuit generates a periodic square wave voltage in response to the start time of the charging time period of the capacitor.

30. The system of claim 29, comprising a voltage limit circuit configured to limit the voltage across the capacitor between the minimum value and the maximum value, the maximum value constituting a first reference voltage and the minimum value constituting a second reference voltage; and the third circuit is configured to control the switching off of the first transistor or the second transistor of the half bridge circuit at a time instant when the voltage across the capacitor reaches the maximum value.

31. The system of claim 30, comprising a fourth circuit having current mirrors configured to charge the capacitor with a current that depends on an output direct current of the resonant circuit.

32. The system of claim 31, wherein the resonant circuit comprises a synchronizing circuit having a comparator configured to compare the signal indicating current flowing in the resonant circuit with a ground reference potential and to control the charging of the capacitor by the current mirrors in response to the comparing; and the voltage limit circuit includes comparators configured to compare the voltage at the terminals of the capacitor with at least the first or second reference voltage.

33. The system of claim 28, comprising a silicon substrate on which the control circuit is formed, and wherein the capacitor is formed outside the silicon substrate.

* * * * *